May 23, 1950  R. B. DOME  2,508,995
POWER SUPPLY
Filed Nov. 6, 1947

Inventor:
Robert B. Dome,
by Merton D Morse
His Attorney.

Patented May 23, 1950

2,508,995

UNITED STATES PATENT OFFICE 2,508,995

POWER SUPPLY

Robert B. Dome, Geddes Township, N. Y., assignor to General Electric Company, a corporation of New York Application November 6, 1947, Serial No. 784,394

4 Claims. (Cl. 171—97)

My invention relates to energizing circuits for radio or television receivers utilizing electronic tubes and in particular to circuits for supplying the unidirectional anode voltage for such tubes.

In the operation of a present-day radio and television receiver, it is usually necessary to provide unidirectional voltages of several values to the vacuum tubes employed in the receiver. This is usually accomplished by a potentiometer arrangement across the output of the power supply and is commonly known as a resistance voltage divider.

One of the objects of my present invention is to provide an improved circuit whereby it is possible to obtain two distinct unidirectional voltage values without the necessity of employing energy consuming resistance voltage dividers.

Another object of my invention is to provide a circuit whereby a high and a low D.-C. voltage value is obtained and wherein the total number of turns required in the secondary winding of a power transformer is substantially the same as would normally be required to produce the low voltage value alone.

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawing, in which Fig. 1 represents an embodiment of a known circuit, and Fig. 2 represents an embodiment of my present invention.

Figure 1:
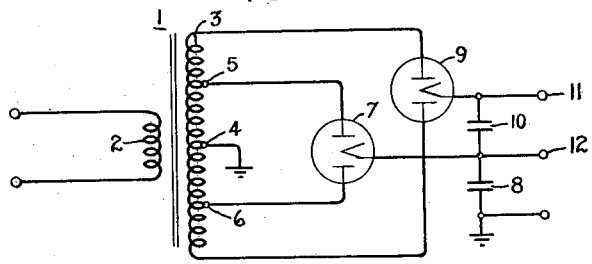

Referring to Fig. 1, I have shown a circuit now used in television receivers, whereby two distinct unidirectional voltages are obtained without the use of a voltage divider. This circuit comprises a power transformer 1 having a primary winding 2 which may be connected, for example, with the usual household supply. The secondary winding 3 is provided with a grounded center-tap 4 and intermediate taps 5 and 6 equidistantly spaced from the mid-tap 4. Two single phase, full-wave rectifying tubes are employed. One of these is shown at 7 and has its two anodes connected respectively to the taps 5 and 6, and has its cathode connected to ground through a capacitor 8. The second rectifying device 9 has its two anodes connected respectively to the two outer extremities of the secondary winding 3, and has its cathode connected to the ungrounded terminal of capacitor 8 through a capacitor 10. It is readily apparent that, by virtue of the fact that the rectifying device 9 is connected across the full secondary, a D.-C. voltage may be taken from between the point 11 and ground, of a value substantially equal to the peak A.-C. voltage between the tap 4 and either extremity of the winding. Since the rectifying device 7 is connected across the taps 5 and 6, a unidirectional voltage may be taken from between terminal 12 and ground, of a lower value substantially equal to the peak A.-C. voltage between the taps 4 and 5.

Figure 2:
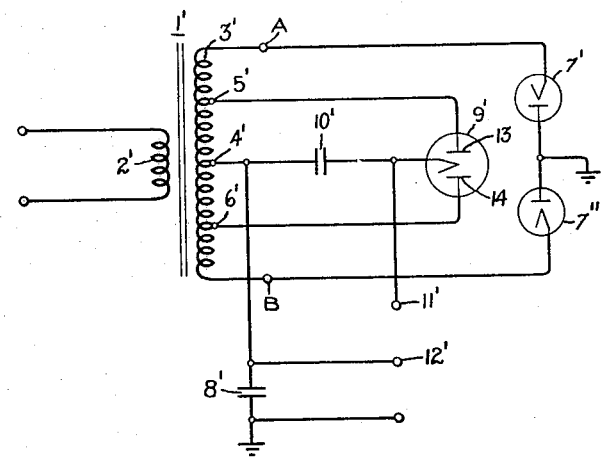

Referring now to Fig. 2, I have shown an embodiment of my improved rectifier circuit. In this circuit, elements similar to those in Fig. 1 are referred to by the same numbers, and these are differentiated by the use of the prime markings. In this circuit two single phase half-wave rectifying devices 7' and 7" have their cathodes connected respectively to each extremity of the secondary winding 3' and their anodes connected together and to ground. A single phase full-wave rectifying device 9' has its anodes connected respectively to the taps 5' and 6'. The cathode of device 9' is connected to the center-tap 4' through a capacitor 10', the center-tap 4' being connected to ground through a capacitor 8'. In this circuit high value D.-C. voltage may be taken from between the terminal 11' and ground, and low value D.-C. voltage may be taken from between the terminal 12' and ground.

In the operation of the circuit of Fig. 2, the D.-C. voltage at the terminal 11' is substantially equal to the peak A.-C. voltage between the tap 5' and extremity B for one-half cycle, and between the tap 6' and extremity A for the next half cycle. This will be readily apparent if point A is considered to be at its maximum positive value. At this moment, anode 13 of the rectifying device 9' is positive with respect to the cathode, and the section of this device between the cathode and anode 13 is, therefore, conductive. The cathode of the rectifying device 7' is positive with respect to the anode, and this device is, therefore, nonconductive. The cathode of the device 7" is negative with respect to the anode, and this device is, therefore, conductive. A path is, therefore, established from terminal 11' through the upper section of the device 9' to the tap 5', through a major portion of the secondary winding to the device 7", and through this device to ground. A half-cycle later, when point B becomes positive, it is apparent that the voltage in the terminal 11' is the voltage between the tap 6' and ground via device 7'.

The low D.-C. voltage, taken from between the terminal 12' and ground is substantially equal to the peak alternating voltage developed between the tap 4' and either extremity A or B. This will be apparent, if once again point A is considered to be at its maximum positive value, as before. Device 7' is nonconductive and device 7" is conductive. Therefore, a path can be traced from point 4' through the device 7" to ground. A half-cycle later, when point B is positive, a path may then be traced between the tap 4' through the device 7' to ground.

The same two D.-C. voltages may be provided by the rectifier shown in Fig. 2 as those provided by the rectifier shown in Fig. 1. However, since the high D.-C. voltage at terminal 11' in Fig. 2 is substantially equivalent to the peak A.-C. voltage developed between the taps 5' or 6' and the furthermost extremity of winding 3', B or A respectively, substantially more than one-half the secondary winding is utilized for each half cycle, and considerably fewer secondary turns are required to produce a high value D.-C. voltage in this circuit, equal to the high value D.-C. voltage in the circuit shown in Fig. 1, wherein only one-half the secondary winding is used for each half cycle.

Similarly, the low value D.-C. voltage obtained by the circuit of Fig. 1 is substantially equal to the peak value of the A.-C. voltage between the taps 5 and 4 and, therefore, less than half the secondary is utilized for each half of the cycle. In the embodiment of my circuit shown in Fig. 2, the low value D.-C. voltage is substantially equal to the peak value of the A.-C. voltage between the center-tap 4' and either extremity, and, therefore, the full half of the secondary winding is used for each half cycle.

An important advantage of my improved rectifier circuit is that there is considerably less heating of the windings of the transformer employed therein. This follows from the fact that for the same output voltages, the potentials across the component parts of the secondary winding are lower, permitting the use of fewer turns of larger and lower resistance wire in a transformer having the same physical dimensions of that of the circuit of Fig. 1.

Another advantage of my improved circuit is that it provides a more favorable distribution of the current carried by the secondary winding of the transformer. Thus, in the circuit of Fig. 1, if the D.-C. output current at the low voltage point is $2i_1$ and the D.-C. output current at the high voltage point is $2i_2$, then that part of the winding from 4 to 5 must carry $i_1$ plus $i_2$ amperes, and from 5 to the extremities, $i_2$ amperes. In Fig. 2, only that part of the winding from 5' to the extremity carries the current $i_1$ plus $i_2$ amperes.

While I have shown a particular embodiment of my invention, it will of course be understood that I do not wish to be limited thereto, since various modifications may be made, and I contemplate by the appended claims to cover any such modifications as fall within the true spirit and scope of my invention.

What I claim as new and desire to secure by Letters Patent of the United States is:

1. In a unidirectional power supply for electronic circuits, a transformer having a winding having terminals, a mid-point, and a pair of taps spaced equidistantly from said mid-point, means for obtaining a high unidirectional voltage comprising a pair of rectifiers having like electrodes connected respectively to one of said terminals and to said mid-point through a capacitance, and the remaining electrodes connected respectively to ground and to the one of said taps positioned on the opposite side of said mid-point from said one terminal, said mid-point being connected to ground through a second capacitance, and a low unidirectional voltage terminal connected to said mid-point.

2. In a power supply for electronic circuits, a transformer having a pair of terminals, a mid-point, and a pair of taps positioned equidistantly from said mid-point, means for deriving a high unidirectional voltage comprising a rectifier having its anode connected to one of said taps and its cathode connected to said mid-point through a capacitance, and a second rectifier connected between the terminal on the side opposite said mid-point from said first tap and ground, said mid-point being connected to ground through a capacitance and a low voltage terminal connected to said mid-point.

3. In a power supply for electronic circuits, a transformer having a winding having a mid-point connected to ground through a capacitance, and terminals connected to ground through a respective one of a pair of rectifiers, said rectifiers having like electrodes connected to ground, a second pair of rectifiers having electrodes corresponding to said like electrodes connected respectively to taps on said winding spaced equidistantly from said mid-point, and the remaining electrodes connected to said mid-point through a capacitance, a high unidirectional voltage terminal connected to said remaining electrodes, and a low unidirectional voltage terminal connected to said mid-point.

4. In combination, a transformer having a winding having a pair of terminals, a mid-point, and a pair of taps spaced equidistantly on either side of said mid-point, a first rectifier having a pair of anodes connected respectively to said taps and a cathode connected to said mid-point through a capacitance, a pair of rectifiers having cathodes connected respectively to said terminals and anodes connected to a point of fixed potential, said mid-point being connected to said point of fixed potential through a capacitance, terminals for high unidirectional voltage connected to the cathode of said first rectifier and said point of fixed potential, and terminals for lower unidirectional voltage connected to said mid-point and said point of fixed potential.

ROBERT B. DOME.

REFERENCES CITED

The following references are of record in the file of this patent:

UNITED STATES PATENTS

| Number | Name | Date |
|---|---|---|
| 2,103,487 | Muller | Dec. 28, 1937 |
| 2,248,370 | MacTaggert | July 8, 1941 |